United States Patent [19]

Kitsuta et al.

[11] 3,901,722
[45] Aug. 26, 1975

[54] METHOD FOR PRODUCING A HIGH STRENGTH CONCRETE

[75] Inventors: Toshiyuki Kitsuta, Morioka; Iwao Mino, Kamakura; Koji Nakagawa, Asahi, all of Japan

[73] Assignees: Japanese National Railways; Denki Kagaku Kogyo Kabushiki Kaisha, both of Tokyo, Japan

[22] Filed: Sept. 27, 1973

[21] Appl. No.: 401,299

[30] Foreign Application Priority Data

Sept. 27, 1972 Japan................................ 47-96750

[52] U.S. Cl. ..................... 106/89; 106/90; 106/314
[51] Int. Cl.² ............................................. C04B 7/02
[58] Field of Search........................ 106/89, 90, 314

[56] References Cited
UNITED STATES PATENTS

| | | | |
|---|---|---|---|
| 3,155,526 | 11/1964 | Klein.................................... | 106/89 |
| 3,251,701 | 5/1966 | Klein.................................... | 106/89 |
| 3,303,037 | 2/1967 | Klein.................................... | 106/89 |
| 3,359,225 | 12/1967 | Weisend .............................. | 106/89 |
| 3,510,326 | 5/1970 | Miki..................................... | 106/89 |
| 3,628,973 | 12/1971 | Greening et al. ..................... | 106/89 |
| 3,663,287 | 5/1972 | Mizunuma et al. .................. | 106/90 |
| 3,666,515 | 5/1972 | Nakagawa............................ | 106/89 |
| 3,677,780 | 7/1972 | Nishi et al............................ | 106/90 |

*Primary Examiner*—J. Poer
*Attorney, Agent, or Firm*—Sughrue, Rothwell, Mion, Zinn and Macpeak

[57] ABSTRACT

A high strength concrete is produced under such condition that the concrete is left to stand under atmosphere and a sufficient curing can not be effected by adding calcium sulfoaluminate hydrate-forming minerals to concrete materials in such a small amount that the concrete does not expand.

6 Claims, 3 Drawing Figures

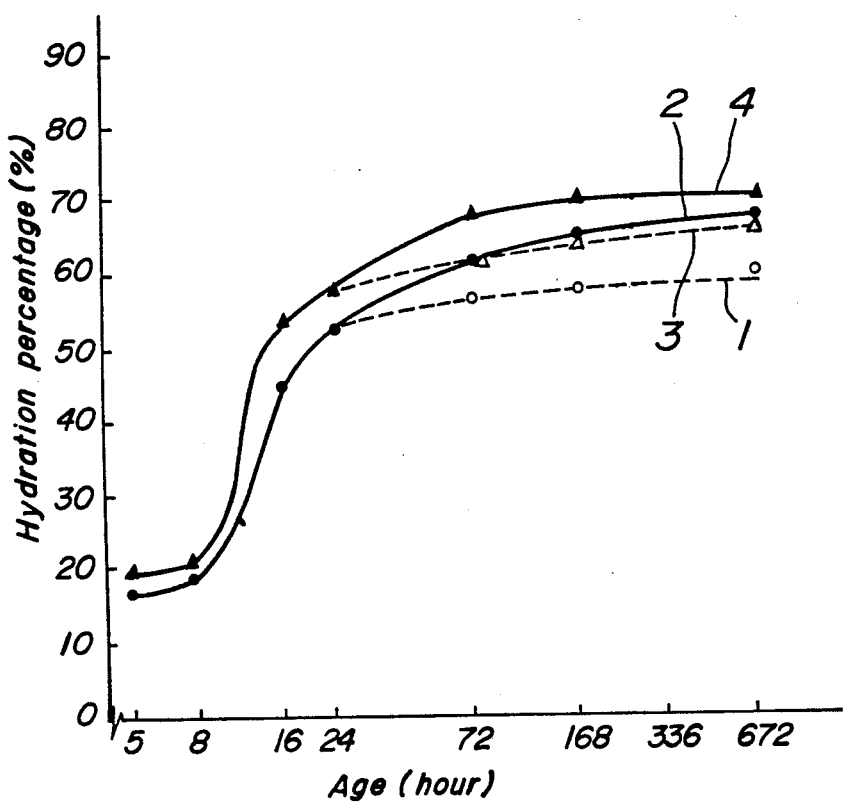
FIG_1

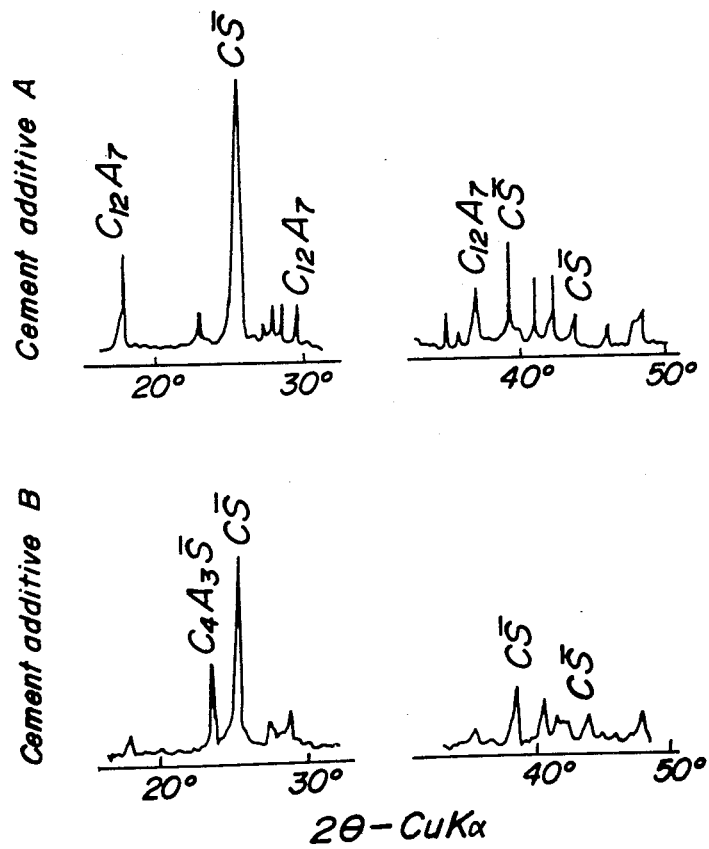
FIG_2

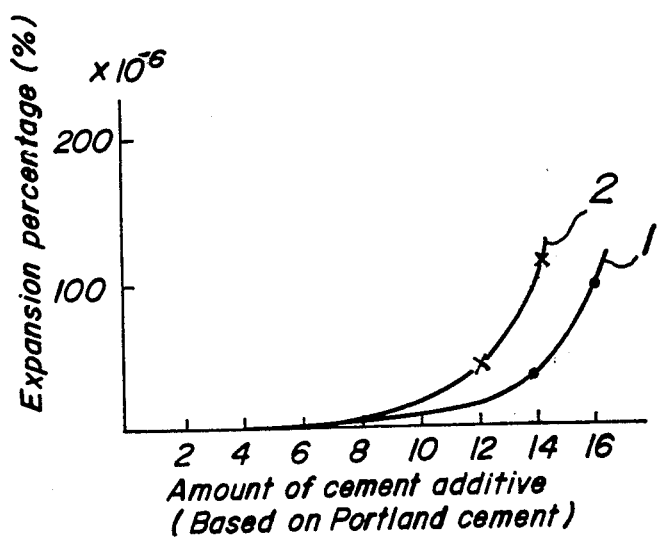
FIG_3

METHOD FOR PRODUCING A HIGH STRENGTH CONCRETE

The present invention relates to a method for producing a concrete having a high strength even by leaving to stand under atmosphere and a high freezing and thawing resistance. When a concrete has a high strength, the necessary cross-sectional area becomes smaller and consequently the weight of the structure is decreased and the working cost is reduced.

A high strength concrete can be obtained when the curing can be fully conducted as in a curing in steam or a curing in water but, when a concrete is cast in place as in a prestressed concrete bridge, the curing cannot be conducted satisfactorily and in general the concrete is exposed to atmosphere. In this case the strength is 20-30% lower than the strength when the curing is effected in water. The high strength concrete which is exposed to atmosphere and cannot be subjected to the curing in water, considerably reduces the freezing and thawing resistance and where the concrete is always exposed to a cold weather, the strength is hardly developed and the durability is low.

The present invention solves these defects and provides a method for producing a concrete showing a compression strength at an age of 28 days of more than 800 Kg/cm$^2$ even by leaving to stand under atmosphere and having an excellent freezing and thawing resistance.

The present invention comprises the production of a high strength concrete under such a condition that the concrete is allowed to stand under atmosphere and a sufficient curing cannot be effected, which is characterized in that calcium sulfoaluminate hydrate-forming mineral powders are added to concrete materials in such a small amount range that the concrete does not expand. It has been known that the presence of calcium sulfoaluminate hydrate-forming minerals compensates the shrinkage of concrete by utilizing the expansion energy generated in the hydration, but in this process it is impossible to increase the compression strength at an age of 28 days to more than 800 Kg/cm$^2$.

The present invention enables to increase the strength of concrete and improve the freezing and thawing resistance by making the calcium sulfoaluminate hydrate-forming minerals present in concrete in such an amount that the concrete does not expand and therefore the present invention is different in the technical idea from the conventional method wherein the shrinkage of concrete is compensated by utilizing the expansion energy.

The calcium sulfoaluminate hydrate-forming minerals to be used in the present invention include the following substances and the item (1) is the most effective.

1. A mixture of a crystalline or amorphous calcium aluminate, such as CA, $C_3A$, $CA_2$, $C_{12}A_7$, $C_{11}A_7 \cdot CaF_2$ and $C_3A_3 \cdot CaF_2$ and gypsum or a product obtained by simultaneously burning the calcium aluminate-forming materials and gypsum can be used. A mixture of an amorphous product of $C_{12}A_7$ or $C_{11}A_7 \cdot CaF_2$ and gypsum is preferred. The weight ratio of calcium aluminate to gypsum is 1:0.5–10, preferably 1:0.8–5.
2. $C_4A_3\bar{S}$-gypsum. The weight ratio of $C_4A_3\bar{S}$ to gypsum is 1:0.2–2, preferably 1:0.4–1.0.
3. Alumina containing slag-gypsum.

In any case, when Free-CaO is not contained, the improvement of strength is high and effective. In the above descriptions, C means CaO, A means $Al_2O_3$ and $\bar{S}$ means $SO_3$.

The amount of these minerals is the range within which the concrete does not expand when the expansion percentage is determined but for cement the amount is 2-13% by weight, preferably 4-8% by weight.

The fineness in Blaine value is not less than 3,000 cm$^2$/g, preferably 4,000–8,000 cm$^2$/g.

In less than 3,000 cm$^2$/g, the function for promoting the hydration of cement considerably lowers and the unreacted product remains for a long period of time and the stability is poor, while when the Blaine value exceeds 8,000 cm$^2$/g, the hydration is too rapid in some minerals and the false setting occurs.

The present invention is characterized in that the calcium sulfoaluminate hydrate-forming mineral powders are compounded in cement in an amount of 2-13% by weight, the unit cement amount (an amount of cement required for the formation of 1 m$^3$ concrete) is 500-700 Kg, a water/cement ratio is 18-35%, and 0.3-5% by weight based on cement, of a surfactant is added while blending concrete. The unit cement amount of 500-700 Kg is essential for the production of the high strength concrete and further is a necessary requirement for developing a high freezing and thawing resistance. When the unit cement amount is less than 500 Kg, even if the calcium sulfoaluminate hydrate-forming minerals are added in such a range that the concrete does not expand, it is impossible to increase the compression strength at an age of 28 days to more than 800 Kg/cm$^2$ and the freezing and thawing resistance cannot be improved.

When the unit cement amount exceeds 700 Kg, the strength is not improved in proportion to the increased amount and rather Young's modulus decreases and the heat amount of hydration is too much.

The cement to be used in the present invention includes Portland series cement, mixed cement and the like.

When the water/cement ratio exceeds 35%, it is impossible to increase the compression strength at an age of 28 days to more than 800 Kg/cm$^2$, while when said ratio is less than 18%, even if a surfactant is used, it is impossible to blend a concrete having a workability suitable for concreting.

In order to provide the workability, such as placing and compaction, the concrete is blended at a slump of 10-20 cm.

In the present invention, it is desirable that a satisfactory workability is obtained in a low unit water amount and for the purpose, at least one of surfactants selected from the group consisting of anionic sulfonate, a sulfuric acid ester salt, non-ionic polyhydric alcohols, a condensate of naphthalenesulfonate with formalin, ethylene oxide addition product and non-ionic anionic surfactants is added in an amount of 0.3-5% by weight based on cement during blending the concrete. Among them, anionic sulfonate is the most effective.

The coarse aggregate to be simultaneously blended must have a strength of at least 1,000 Kg/cm$^2$ and the fine aggregate ratio is used in an amount of 20-50% by weight.

The concrete produced under such conditions has a compression strength at an age of 28 days of more than 800 Kg/cm$^2$ only by leaving to stand under atmosphere and the creep properties and the compression fatigue properties are favorable and the seawater resistance and the freezing and thawing resistance are high.

The freezing and thawing resistance is a required property to give the high strength of more than 800 Kg/cm² to the cast-in-place concrete, which is always exposed to a cold weather and the concrete using a conventional AE agent cannot develop such a high strength.

The reason why the cast-in-place concrete under a cold weather shows the high strength owing to the high freezing and thawing resistance is presumably based on the followings. In the original hydration reaction, the calcium sulfoaluminate hydrate having a large amount of water of crystallization is present in the concrete system and the free water having a relation to the freezing and thawing is contained as a very stable water of crystallization and a dense structure can be obtained.

As mentioned above, the concrete obtained in the method of the present invention, even if the curing which is heretofore and generally needed, is not conducted, has a compression strength of more than 800 Kg/cm² at an age of 28 days and further the freezing and thawing resistance is high and therefore the present invention is useful for the concreting in site at a cold weather place.

In order to make the content of the present invention more clear, an explanation will be made with respect to the result of X-ray diffraction for a cement paste prepared under the same conditions as in Example 1.

FIG. 1 is a view showing a relation of the hydration percentage of cement to the age.

In the measurement, a high-early-strength cement is used, water/cement ratio is 30% and 1% by weight based on cement, of an anionic sulfonate surfactant (made by KAO SOAP K.K., Trade Mark: Mighty 150) is added thereto and the resulting cement paste is cured in water or air and an amount of unhydrated alit is determined by X-ray diffraction with respect to each sample and calculated into the hydration percentage.

Both the curves 1 and 2 show the result of samples in which the calcium sulfoaluminate hydrate-forming minerals are not added and the curve 1 shows the sample of curing in air and the curve 2 shows the sample of curing in water.

The curves 3 and 4 show the result of the cement paste added with the calcium sulfoaluminate hydrate-forming minerals prepared in Example 1 and the curve 3 shows the sample of curing in air and the curve 4 shows the sample of curing in water.

As seen from FIG. 1, the curve 2 and the curve 3 show the same tendency and this shows the activity of the cement additive according to the present invention.

Furthermore, the similar tendency was confirmed by the thermal analysis of the cement paste, such as an ignition loss, a differential thermal analysis, a thermobalance and the like.

The present invention will be explained in more detail.

For a better understanding of the invention, reference is taken to the accompanying drawings, wherein:

FIG. 1 is a view showing a relation of the hydration percentage of the cement samples to the age (hours) through an X-ray diffraction process;

FIG. 2 is views of X-ray diffraction of the cement additives to be used in the present invention; and FIG. 3 is a view showing a relation of the expansion percentage determined by JIS Mortal to the amount of the cement additive added.

The following examples are given for the purpose of illustration of this invention and are not intended as limitations thereof.

In Example 1, the calcium sulfoaluminate hydrate-forming minerals consisting mainly of $C_{12}A_7$—$CaCO_4$ (referred to as "cement additive A" hereinafter) and $C_4A_3\bar{S}$—$CaSO_4$ (referred to as "cement additive B" hereinafter) are added.

Examples 2 and 3 show the tests in which the experiments were effected by adding the cement additive A and at a low temperature.

EXAMPLE 1

Quick lime, bauxite and gypsum having the chemical components as shown in Table 1 were used as the starting materials. 14.4% by weight of quick lime, 17.0% by weight of bauxite and 68.6% by weight of gypsum were compounded and 5% by weight of fluorite was added thereto and the resulting mixture was fused in an electric furance. The melt at a temperature of 1,290°C was taken out in a mold and gradually cooled and then pulverized (cement additive A).

The same melt was blown into air and quenched and pulverized (cement additive B).

The cement additive A consists mainly of $C_{12}A_7$ and $CaSO_4$ and the cement additive B consists mainly of $C_4A_3\bar{S}$ and $CaSO_4$.

The chemical analytical value of these additives is shown in Table 2 and the X-ray diffraction views of these minerals are shown in FIG. 2.

These cement additives were pulverized into a Blaine value of 5,500 cm²/g and each of the thus pulverized cement additives was added to high-early-strength Portland cement in an amount of 0–16% by weight based on the cement. A mortar having a weight ratio of each of the mixed cements and sand being 1:2 was prepared into a sample of 4×4×16 cm. The thus formed sample was determined with respect to the variation of length (expansion percentage) by a comparator (following to JIS R5201, JIS A1124) and the result is shown in FIG. 3. In FIG. 3, the curve 1 shows the result of the sample using the additive A and the curve 2 shows the result of the sample using the additive B.

Table 1

| Starting material | Component Ignition loss | Chemical component (%) | | | | | | |
|---|---|---|---|---|---|---|---|---|
| | | $Al_2O_3$ | CaO | $SO_3$ | $SiO_2$ | $Fe_2O_3$ | Others | Total |
| Quick lime | 0.1 | 0.5 | 95.7 | 0.2 | 0.4 | 1.9 | 0.8 | 99.6 |
| Bauxite | 0.3 | 86.2 | 0.3 | | 3.9 | 5.5 | 3.4 | 99.6 |
| Gypsum | 1.7 | 0.3 | 39.4 | 57.6 | 0.3 | 0.1 | 0.3 | 99.9 |

Table 2

Chemical component of cement additive.

| Component | Insoluble component | $Al_2O_3$ | CaO | $SO_3$ | $SiO_2$ | $Fe_2O_3$ | Others |
|---|---|---|---|---|---|---|---|
| Wt% | 0.1 | 16.5 | 44.1 | 37.0 | 1.2 | 0.7 | 1.8 |

By using the cement additive A, a concrete test was effected. The physical properties and the chemical components of the concrete material are shown in Tables 3, 4, 5 and 6.

Table 3

Physical properties of high-early-strength Portland cement.

| Specific gravity | Fineness | | Water amount (%) | Setting | | Strength (Kg/cm²) | | | | | |
|---|---|---|---|---|---|---|---|---|---|---|---|
| | Blaine value (cm²/g) | 88μ residue (%) | | Initial | Final | Bending | | | Compression | | |
| | | | | hr. min. | hr. min. | 1 day | 7 days | 28 days | 1 day | 7 days | 28 days |
| 3.12 | 4,390 | 0.4 | 28.6 | 2 – 32 | 3 – 27 | 35.7 | 67.3 | 78.4 | 136 | 355 | 453 |

Table 4

Chemical component and various factors of high-early-strength Portland cement.

| Ignition loss | Insoluble component | $SiO_2$ | $Al_2O_3$ | $Fe_2O_3$ | CaO | MgO | $SO_3$ | F-CaO | Total | SM | IM | HM |
|---|---|---|---|---|---|---|---|---|---|---|---|---|
| 0.7 | 0.1 | 20.4 | 5.2 | 2.8 | 65.8 | 1.5 | 2.4 | 0.4 | 99.3 | 2.6 | 1.9 | 2.26 |

Table 5

Physical properties of aggregate.

| | Percentage passed through screen (%) | | | | | | | | | | Fineness modulus | Specific gravity | Water absorbed amount % | Unit amount (Kg/m³) |
|---|---|---|---|---|---|---|---|---|---|---|---|---|---|---|
| | 25 mm | 20 mm | 15 mm | 10 mm | 5 mm | 2.5 mm | 1.2 mm | 0.6 mm | 0.3 mm | 0.15 mm | | | | |
| Himegawa crushed stone | 100 | 22.4 | — | 42.2 | — | — | — | — | — | — | 6.54 | 2.65 | 0.99 | 1,602 |
| Liver sand | | | | | 100 | 90.6 | 69.0 | 42.2 | 18.6 | 4.2 | 2.75 | 2.63 | 1.52 | 1,695 |

Table 6

| | Rock quality | Strength (Kg/cm²) |
|---|---|---|
| Himegawa crushed stone | Granite, Andesite, Sand stone | 1,500 – 2,500 |

The concrete compounding is shown in the following Table 7. The unit Portland cement amounts were 450, 500, 600 and 700 Kg and the cement additive was added in an amount of 0–15% by weight based on Portland cement and substituted for the aggregate. The surfactant of Mighty 150 as mentioned above was used in an amount of 1.2% by weight (unit amount: 6 Kg/m³) based on Portland cement and substituted for the same amount of water.

The slump was adjusted to 12–15 cm.

The result of the strength test of the concrete is shown in Table 7.

The samples of Experiment Nos. 6, 11 and 15 show the expansion but in the other samples, the expansion was not observed.

Experiment Nos. 2, 3, 4, 5, 8, 9, 10, 13 and 14 are the method of the present invention.

With respect to the cement additive B, the same test was made and substantially the same result was obtained.

Table 7

| Experiment No. | Concrete compounding | | | | | Curing in water (20°C) | | Curing in air | | Actually measured slump (cm) |
|---|---|---|---|---|---|---|---|---|---|---|
| | Cement (Kg/m³) | Cement additive (Kg/m³) | (%) | Fine aggregate ratio (%) | Water/cement ratio (%) | Compression (Kg/cm²) | Bending (Kg/cm²) | Compression (Kg/cm²) | Bending (Kg/cm²) | |
| 1 | 500 | 0 | 0 | 34 | 30.0 | 809 | 74.6 | 714 | 64.8 | 13.8 |
| 2 | 500 | 15 | 3 | 34 | 30.0 | 805 | 73.8 | 835 | 74.3 | 14.6 |
| 3 | 500 | 25 | 5 | 34 | 30.9 | 810 | 87.5 | 945 | 84.6 | 12.6 |
| 4 | 500 | 40 | 8 | 34 | 32.0 | 765 | 91.2 | 823 | 81.9 | 13.6 |
| 5 | 500 | 65 | 13 | 34 | 32.5 | 751 | 87.3 | 810 | 81.0 | 13.5 |
| 6 | 500 | 75 | 15 | 34 | 33.2 | 689 | 58.6 | 706 | 68.9 | 13.5 |
| 7 | 600 | 0 | 0 | 32 | 29.0 | 846 | 87.3 | 740 | 72.1 | 14.2 |
| 8 | 600 | 15 | 2.5 | 32 | 29.6 | 888 | 92.7 | 860 | 81.5 | 14.0 |
| 9 | 600 | 30 | 5 | 32 | 30.5 | 857 | 92.8 | 867 | 77.1 | 13.9 |

Table 7-continued

| | Concrete compounding | | | | | Curing in water (20°C) | | Curing in air | | |
|---|---|---|---|---|---|---|---|---|---|---|
| Experiment No. | Cement (Kg/m³) | Cement additive (Kg/m³) | (%) | Fine aggregate ratio (%) | Water/cement ratio (%) | Compression (Kg/cm²) | Bending (Kg/cm²) | Compression (Kg/cm²) | Bending (Kg/cm²) | Actually measured slump (cm) |
| 10 | 600 | 40 | 6.7 | 32 | 31.0 | 844 | 92.1 | 869 | 82.5 | 14.2 |
| 11 | 600 | 90 | 15 | 32 | 32.0 | 615 | 52.1 | 652 | 65.2 | 15.0 |
| 12 | 700 | 0 | 0 | 30 | 26.4 | 877 | 90.6 | 790 | 77.4 | 15.5 |
| 13 | 700 | 15 | 2.1 | 30 | 27.0 | 866 | 92.7 | 916 | 79.3 | 13.7 |
| 14 | 700 | 35 | 5 | 30 | 28.0 | 805 | 90.5 | 935 | 86.2 | 12.9 |
| 15 | 700 | 105 | 15 | 30 | 29.5 | 402 | 31.3 | 651 | 58.2 | 12.0 |
| 16 | 450 | 22.5 | 5 | 34 | 36.0 | 705 | 61.8 | 620 | 55.2 | 14.0 |

EXAMPLE 2

By using the cement additive A prepared in Example 1 and the high-early-strength Portland cement in Table 4, a concrete test at a low temperature of 5°C was made. The concrete compounding rate was shown in the following Table 8 but the other was the same as in Example 1.

Table 8

| | | Concrete compounding | | | | | |
|---|---|---|---|---|---|---|---|
| Experiment No. | Water/cement ratio (%) | Fine aggregate ratio S/a (%) | Cement amount (Kg/m³) | Water (Kg/m³) | Fine aggregate amount (Kg/m³) | Coarse aggregate amount (Kg/m³) | Mighty 150 (Kg/m³) | Cement additive (Kg/m³) |
| 17 | 28.8 | 34 | 550 | 158 | 586 | 1,158 | 8.25 | 0 |
| 18 | 29.1 | 34 | 550 | 160 | 565 | 1,152 | 8.25 | 22 |
| 19 | 29.4 | 34 | 550 | 162 | 555 | 1,149 | 8.25 | 33 |

In any of the Experiment Nos. the slump was 18±2 cm and the temperature was adjusted by ice water. The result of the strength test is shown in the following Table 9 but this is an average value of three samples of φ15×50 cm and the curing was effected by leaving to stand the samples in a chamber at 5°C under a humidity of 50%. The samples did not expand.

Table 9

| Experiment No. | Compression strength (Kg/cm²) | |
|---|---|---|
| | 7 days | 28 days |
| 17 | 725 | 785 |
| 18 | 905 | 957 |
| 19 | 898 | 950 |

EXAMPLE 3

By using the cement additive A prepared in Example 1, the high strength concretes having a compression strength of more than 800 Kg/cm² (an age of 28 days) were prepared in the recipe of Table 10. For the comparison, the result of the commercially available high-early-strength Portland cement (Experiment No. 21) is shown together. The other materials were same as in Example 2. The addition ratio of Mighty 150 is based on the cement.

Table 10

| Experiment No. | Coarse aggregate maximum size (mm) | Water/cement ratio (%) | Fine aggregate ratio (%) | Concrete Compounding Unit amount (Kg/m³) | | | | | Mighty 150 (%) | Slump (cm) | Air amount (%) |
|---|---|---|---|---|---|---|---|---|---|---|---|
| | | | | Cement | Cement additive A | Water | Fine aggregate | Coarse aggregate | | | |
| 20 | 25 | 28.0 | 32 | 600 | 30 | 168 | 526 | 1,126 | 1.7 | 19.7 | 1.5 |
| 21 | 25 | 28.0 | 34 | 600 | — | 168 | 560 | 1,092 | 1.3 | 18.2 | 1.5 |

For the measurement of the dynamic modulus of elasticity and the strength, the samples of 7.5×10×10 cm and 10φ×20 cm were molded respectively and the freezing and thawing test was made following to ASTM.

The curing was previously effected in air for 14 days (December in Niigata Prefecture, cold area in Japan) and then the freezing and thawing test was started.

The compression strength was measured at the intervals of the cycles as shown in the following Tables and the durability index (DF value) was determined.

The results of measurement of strength (an average of two times) and the dynamic modulus of elasticity (an average of three times) are shown in Tables 11 and 12. The numeral values in the parenthesis are the relative values.

Table 11

Result of the freezing and thawing test in strength

| Experiment No. | Strength at age of 28 days (Kg/cm$^2$) | Start of freezing and thawing (age of 14 days) | Freezing and thawing cycle number | | | | | | | DF value (%) |
|---|---|---|---|---|---|---|---|---|---|---|
| | | | 10 | 20 | 30 | 50 | 70 | 100 | 150 | |
| 20 | 902 | 810 (100) | 815 (101.6) | 810 (100) | 791 (95.5) | 745 (84.7) | 698 (74.0) | 637 (61.8) | 472 (34.0) | 20 |
| 21 | 851 | 795 (100) | 776 (95.3) | 708 (79.4) | 520 (42.7) | 387 (23.7) | 265 (11.1) | 200 (6.3) | 150 (3.6) | 6 |

Table 12

Result of the freezing and thawing test in dynamic modulus of elasticity

| Experiment No. | Start of freezing and thawing (age of 14 days) (Kg/cm$^2$) | Freezing and thawing cycle number | | | | | | | DF value (%) |
|---|---|---|---|---|---|---|---|---|---|
| | | 10 | 20 | 30 | 50 | 70 | 100 | 150 | |
| 20 | 6.72×10$^5$ (100) | 6.72×10$^5$ (100) | 6.60×10$^5$ (95.0) | 6.56×10$^5$ (93.1) | 6.13×10$^5$ (83.2) | 5.60×10$^5$ (69.5) | 4.50×10$^5$ (45.0) | 0.80×10$^5$ (19.9) | 16.0 |
| 21 | 6.78×10$^5$ (100) | 6.01×10$^5$ (78.5) | 5.11×10$^5$ (52.0) | 2.24×10$^5$ (10.9) | 0.18×10$^5$ (7.4) | — | — | — | 2.6 |

What is claimed is:

1. A method for producing a high compressive strength concrete having a high freezing and thawing resistance under the condition that the concrete is left to stand under atmosphere and a sufficient curing can not be effected, which comprises blending 2–13% by weight based on cement of (A) a mixture of 12CaO.7Al$_2$O$_3$ not containing free-CaO and gypsum or (B) a product not containing free-CaO obtained by simultaneously burning a material to form 12CaO.7Al$_2$O$_3$ and gypsum, to Portland cement in a unit cement amount of 500 – 700 Kg and a water cement ratio of 18 – 35%, the weight ratio of 12CaO.7Al$_2$O$_3$ to gypsum being 1:0.8–5, the fineness in Blaine value of the 12CaO.7Al$_2$O$_3$ being 4,000 – 8,000 cm$^2$/g.

2. A method as claimed in claim 1, wherein 0.3–5% by weight based on cement of at least one of surfactants selected from the group consisting of an anionic sulfonate, sulfuric acid ester salts, a non-ionic polyhydric alcohol, a condensate of naphthalenesulfonate and formalin, an ethylene oxide addition product and a nonionic anionic surfactant is added thereto.

3. The method as claimed in claim 1, wherein the amount of (A) or (B) is 4–8% by weight.

4. The method of claim 1 wherein said blended concrete is concreted on site and has a compression strength at an age of 28 days of more than 800 Kg/cm$^2$.

5. A method as claimed in claim 4, wherein 0.3–5% by weight based on cement of at least one of surfactants selected from the group consisting of an anionic sulfonate, sulfuric acid ester salts, a nonionic polyhydric alcohol, a condensate of naphthalenesulfonate and formalin, an ethylene oxide addition product and a nonionic anionic surfactant is added thereto.

6. The method of claim 1 wherein the 12CaO.7Al$_2$O$_3$ has an amorphous form.

* * * * *